United States Patent [19]

Steel et al.

[11] Patent Number: 4,737,969

[45] Date of Patent: Apr. 12, 1988

[54] SPECTRALLY EFFICIENT DIGITAL MODULATION METHOD AND APPARATUS

[75] Inventors: Francis R. Steel, Parkland; Clifford D. Leitch, Coral Springs; Jose I. Suarez, Miami, all of Fla.

[73] Assignee: Motorola, Inc., Schaumburg, Ill.

[21] Appl. No.: 7,847

[22] Filed: Jan. 28, 1987

[51] Int. Cl.$^4$ .............................................. H04L 27/20
[52] U.S. Cl. ......................................... 375/67; 375/39; 455/60
[58] Field of Search ...................... 375/39, 42, 67, 122, 375/59, 62; 381/31, 32; 455/105, 60; 364/721; 332/9 R

[56] References Cited

U.S. PATENT DOCUMENTS

| | | |
|---|---|---|
| 3,378,771 | 4/1968 | Van Gerwen et al. ............... 455/60 |
| 4,389,722 | 6/1983 | Hofmeister ........................... 375/39 |
| 4,658,405 | 4/1987 | Yazuka et al. ........................ 455/60 |

Primary Examiner—Robert L. Griffin
Assistant Examiner—Marianne Huseman
Attorney, Agent, or Firm—Mark P. Kahler; Joseph T. Downey; Anthony J. Sarli

[57] ABSTRACT

A method and apparatus are provided for generating a uniquely shaped prototype digital pulse which is transmitted with minimal frequency spectrum consumption and yet a relatively high bit rate. Such uniquely shaped digital pulse is stored in a memory included in a transmitter until transmission is desired, at which time a positive of the pulse is transmitted to correspond to a first logic level or the negative of the pulse is transmitted to correspond to a second logic level.

5 Claims, 8 Drawing Sheets

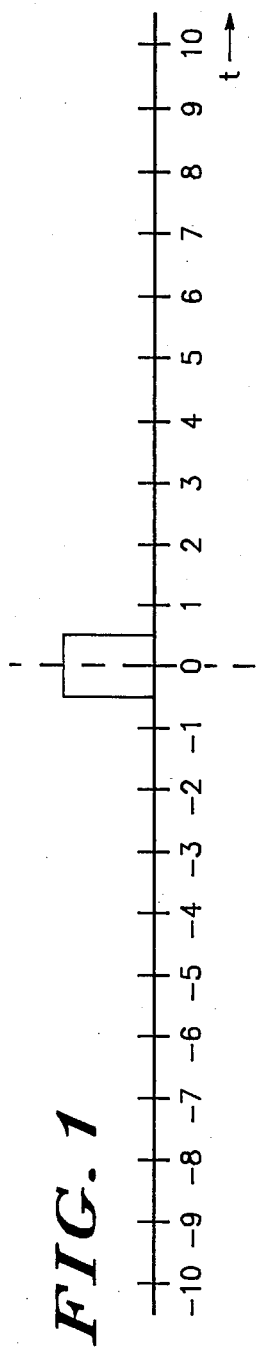
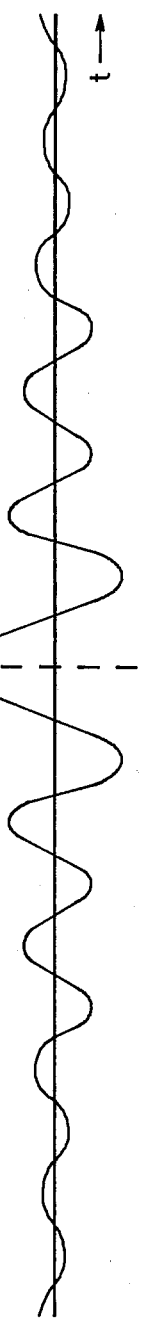
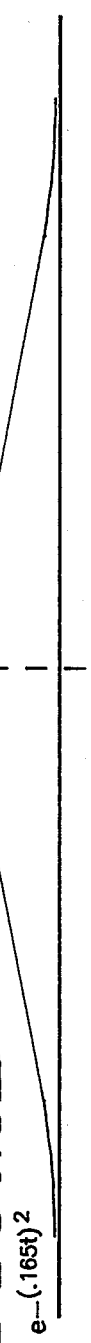
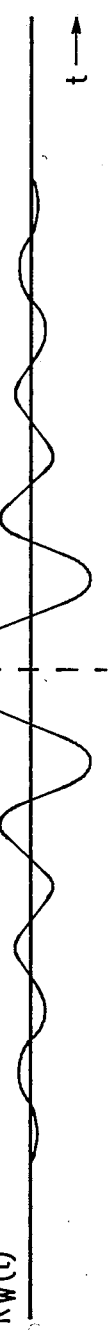
FIG. 1
FIG. 2A
FIG. 2B
$e^{-(.165t)^2}$
FIG. 2C
$R_w(t)$

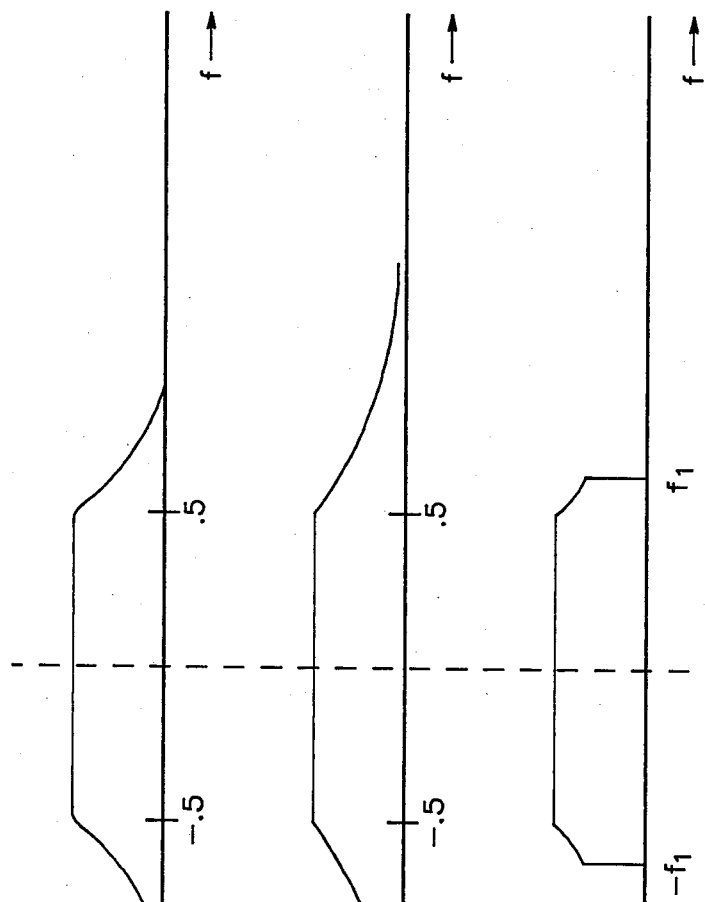
FIG.2D F[R_w(t)]
FIG.2E F[X(f)]
FIG.2F Z(f)
FIG.2G Z(t)

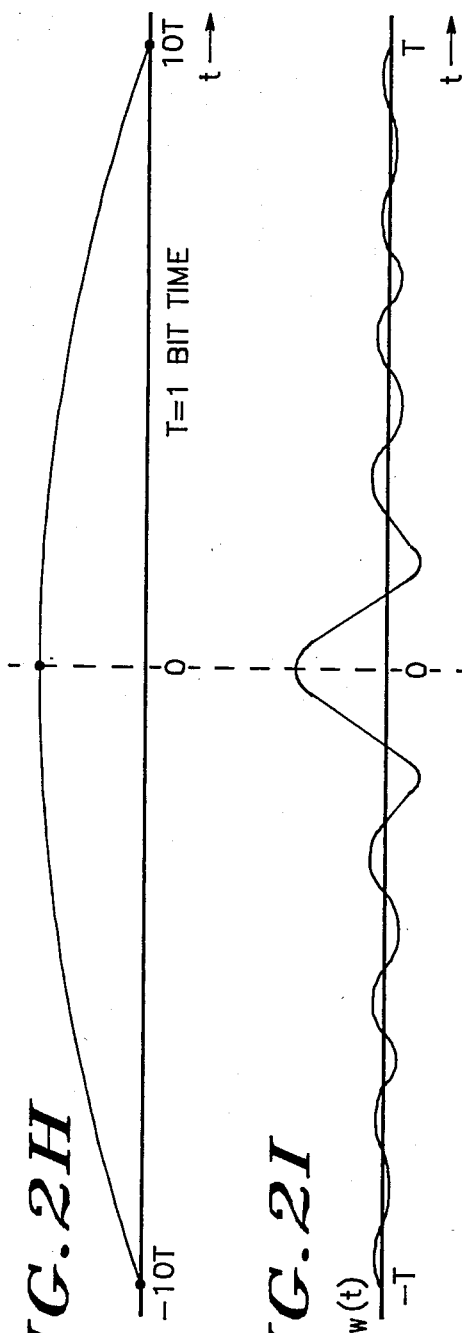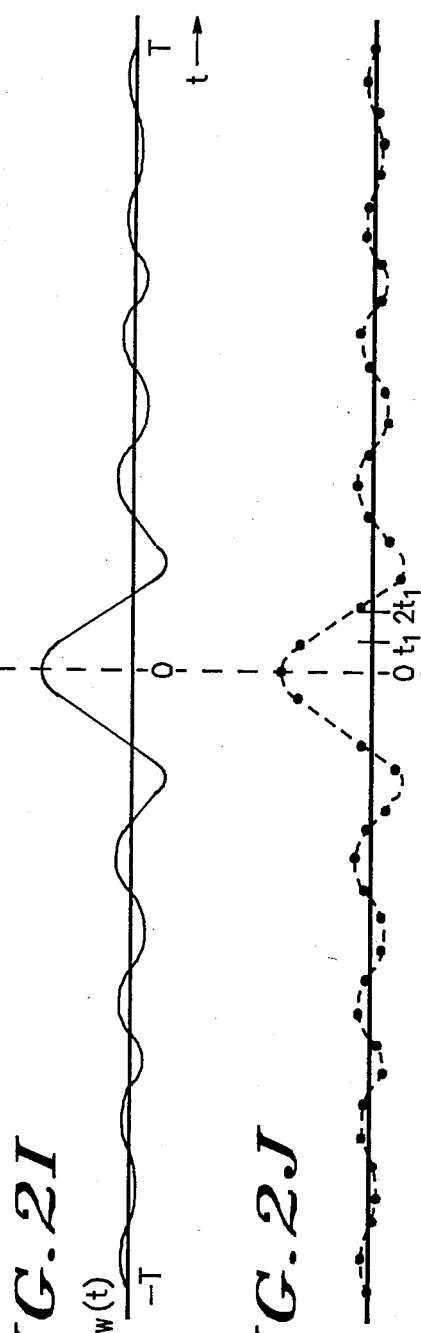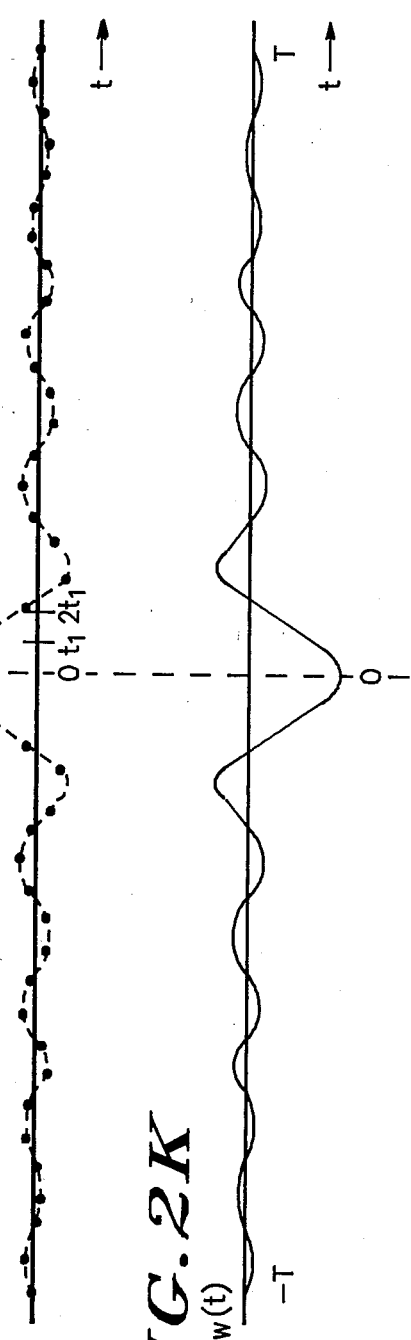

100

SPECTRALLY EFFICIENT DIGITAL MODULATION METHOD AND APPARATUS

BACKGROUND OF THE INVENTION

This invention relates to digital communications systems. More particularly, the invention relates to communications systems in which the characteristics of digital signals transmitted via radio waves are modified to achieve spectral efficiency and high bit rate. Systems with high bit rates are generally desirable to maximize the amount of information which is transmitted per unit time. Systems with high spectral efficiency are also desirable to maximize the number of users which can effectively occupy a given portion of frequency spectrum. Those skilled in the digital radio communications art appreciate that the goal of achieving a high bit rate in digital radio communications systems is generally in conflict with the goal of frequency spectrum conservation. That is, if the bit rate of the transmitted digital signal is increased, the amount of frequency spectrum consumed tends to increase as well.

Other factors which affect spectral efficiency include the power of the transmitted digital radio signal. That is, if a particular type of digital modulation requires a relatively high amount of power in order to permit proper detection at the receiver, then such high power transmission is more likely to cause interference to signals on adjacent channels than digital modulation techniques which require lower power to achieve the same amount of receiver sensitivity or effective reception.

A key issue in designing an efficient digital transmission system is the selection of the prototype pulse which is used to represent a transmitted symbol. Those skilled in the digital communications art also refer to such a prototype pulse as the "signalling waveform". The possible signalling waveforms to be transmitted are given by the mathematical expression $k_n*p(t)$, wherein $p(t)$ is the prototype pulse and $k_n$ is one member of a set of constants. For example, a binary transmission system frequently uses $k_0 = -1$ to transmit a "0", and $k_1 = 1$ to transmit a "1".

For best power efficiency, the prototype pulse must have low intersymbol interference. In mathematical terms, the set of signalling waveforms must be an orthogonal set, or a nearly orthogonal set.

For best spectrum efficiency in transmission, the prototype pulse must have the most compact possible spectrum.

For best efficiency in the hardware used for encoding and decoding transmitted signals, the prototype pulse must be as short in time as possible. The complexity of the hardware tends to be proportional to the length of the prototype pulse or signalling waveform.

The three efficiency criteria expressed above tend to be mutually exclusive. That is, optimizing one of the criteria tends to make at least one of the other criteria unsatisfactory. For example, a rectangular prototype pulse with a length of one bit time is optimized for minimized pulse length. Unfortunately, the broad spectrum of such prototype pulse is hundreds of times wider than what is required to transmit information. A substantially opposite example is the case where the prototype pulse is a sin(pi*t)/(pi*t) pulse. Such a pulse has the most compact frequency spectrum possible, but unfortunately its pulse length in the time domain is hundreds of times that of the rectangular prototype pulse.

It is believed that no prior method or apparatus has successfully generated a prototype pulse or signalling waveform which fully satisfies all three of the above efficiency criteria simultaneously.

BRIEF SUMMARY OF THE INVENTION

One object of the present invention is to provide a method of pulse shaping which permits generation of a digital pulse or signalling waveform of minimal length which can be transmitted at a high bit rate with simultaneous high spectral efficiency.

Another object of the present invention is to provide a method of pulse shaping which permits generation of a digital pulse which can be transmitted at relatively low power levels and yet be effectively received.

In one embodiment of the invention, a method of transmitting digital signals is provided including the steps of retrieving from a memory a plurality of samples which together correspond to a predetermined pulse shape and converting the plurality of samples to an analog signal exhibiting the predetermined pulse shape. The method further includes transmitting the predetermined pulse shape when one of first and second digital signal levels is desired to be communicated, and transmitting the negative of the predetermined pulse shape when the other of said first and second digital signal levels is desired to be communicated.

In another embodiment of the invention, a method of transmitting quadrature amplitude modulated (QAM) signals is provided including the steps of retrieving a pulse stored in a memory, wherein the pulse is generated by selecting an autocorrelation function R(t) exhibiting the property of low intersymbol interference and corresponding to a first pulse. The autocorrelation function R(t) is windowed with a function selected to attenuate the tails of the autocorrelation function R(t) while substantially preserving the low intersymbol interference property thereof, thus generating a windowed autocorrelation function $R_w(t)$ corresponding to a second pulse. The power spectrum of the second pulse is determined by taking the Fourier transform of the windowed autocorrelation function $R_w(t)$. The voltage spectrum of the second pulse is determined. The voltage spectrum thus determined is truncated at upper and lower frequency bounds to generate a truncated voltage spectrum corresponding to a third pulse, the upper and lower frequency bounds being selected to minimize the occupied bandwidth of the third pulse while substantially preserving the low intersymbol interference property thereof. The inverse Fourier transform of the truncated voltage spectrum is determined and is windowed with an arbitrary function to generate the optimized pulse. The arbitrary function is selected to minimize the length of the optimized pulse in the time domain while substantially preserving its low intersymbol interference property and substantially minimizing the occupied bandwidth. The optimized pulse thus formed is stored in memory for recall as needed to construct a digital signal corresponding a particular bit stream of digital information. That is, the optimized pulse is retrieved from memory and transmitted on one of the I and Q channels when one of first and second digital signal levels is desired to be transmitted, and the negative of the retrieved optimized pulse is transmitted on one of the I and Q channels when the other of the first and second signal levels is desired to be transmitted.

The features of the invention believed to be novel are specifically set forth in the appended claims. However, the invention itself, both as to its structure and method of operation, may best be understood by referring to the following description and the accompanying drawings.

BRIEF DESCRIPTION OF THE DRAWINGS

FIG. 1 is a representation of a rectangular digital prototype pulse or signalling waveform which results in consumption of relatively large amounts of frequency spectrum when modulated on a radio frequency carrier signal.

FIG. 2A is a graphic representation of the autocorrelation function of a pulse which exhibits the property of no intersymbol interference, namely a sin(pi*t)/(pi*t) autocorrelation function.

FIG. 2B is a representation of an exponential windowing function.

FIG. 2C is a representation of the autocorrelation function which results when the autocorrelation function of FIG. 2A is windowed with the windowing function of FIG. 2B.

FIG. 2D is a representation of the power spectrum of the pulse corresponding to the autocorrelation function of FIG. 2C.

FIG. 2E is a representation of the voltage spectrum of the pulse corresponding to the autocorrelation function of FIG. 2C.

FIG. 2F is a representation of the voltage spectrum of FIG. 2F after such voltage spectrum has been truncated at selected upper and lower frequency bounds.

FIG. 2G is a representation of the pulse which exhibits the autocorrelation function shown in FIG. 2F.

FIG. 2H is a representation of a cosine windowing function.

FIG. 2I is a representation of the optimized prototype pulse generated by truncating the pulse of FIG. 2G at selected bounds.

FIG. 2J. is a representation of samples of the pulse waveform of FIG. 2I taken at selected time intervals.

FIG. 2K is a representation of the negative of the optimized prototype pulse of FIG. 2I.

DETAILED DESCRIPTION OF THE INVENTION

Figure 3:
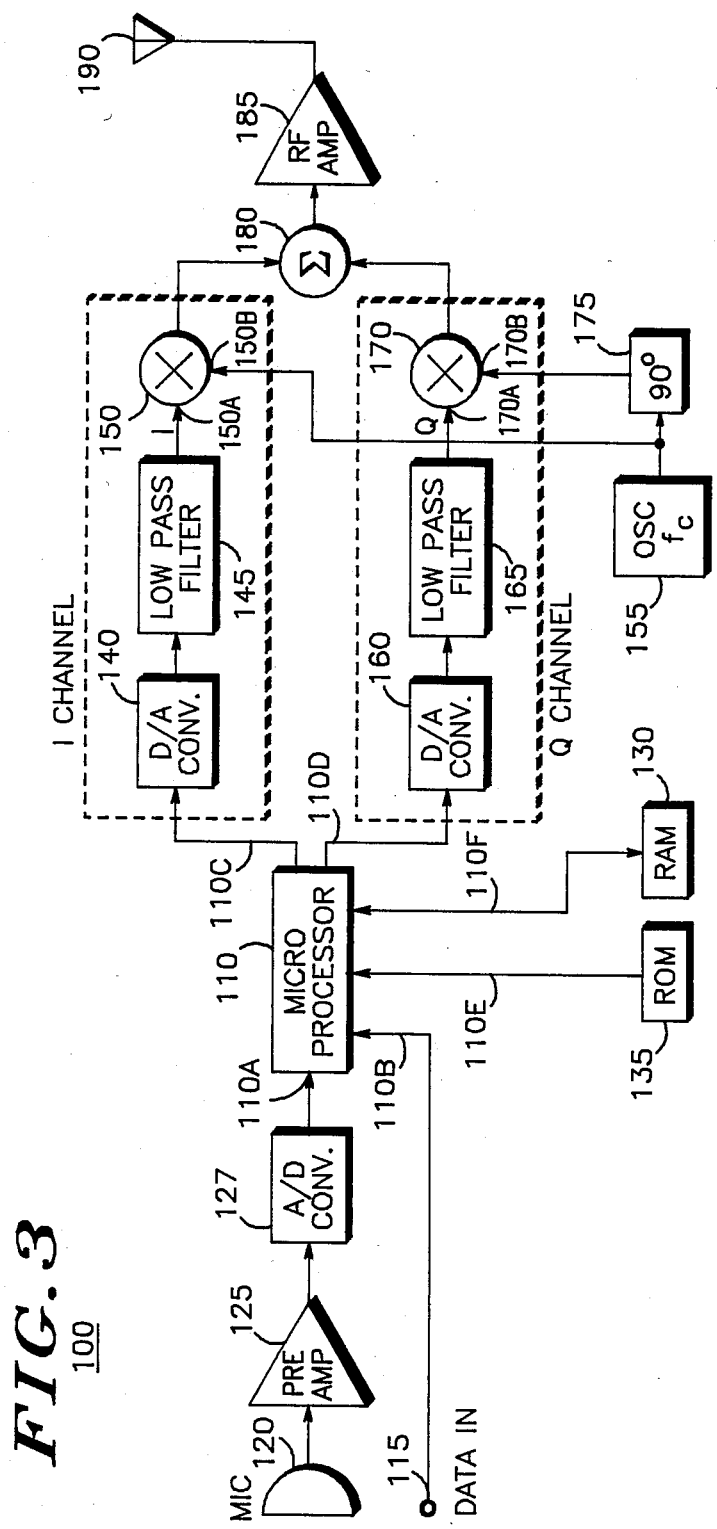
FIG. 3 is a block diagram of transmitting apparatus in accordance with the present invention.

To facilitate understanding of the invention, a discussion of the method of generating a digital pulse which is optimized both in terms of the time domain (bit rate, pulse duration) and frequency domain (frequency consumed) ensues. For purposes of this example, it is assumed that digital pulses normalized to 1 bit/sec such as the pulse illustrated in FIG. 1, are desired to be transmitted. If a series of such nearly square wave or rectangular pulses were modulated on an electromagnetic carrier wave, the sharp transitions of such pulses would result in the consumption of an unduly large amount of frequency spectrum. This is not acceptable given the bandwidth constraints which are imposed on modern communications systems.

Rather, a more optimal pulse shape is required to conserve valuable frequency spectrum and yet to permit sufficient information throughput per unit time. In accordance with the present invention, the first step in generating such an optimally shaped pulse or optimal pulse is to select a particular autocorrelation function $R(t)$ which exhibits the property of no intersymbol interference. An autocorrelation function exhibits the property of no intersymbol interference when it exhibits a maximum at $t=0$ and exhibits periodic zeroes at intervals of 1 bit time. That is, such an autocorrelation function exhibits zeroes at multiples of N times the bit time wherein $N=1,2,3,\ldots$ and $N=-1,-2,-3,\ldots$ The autocorrelation function of one pulse which satisfies these criteria, namely the autocorrelation function $R(t)=\sin(pi*t)/(pi*t)$, is shown in FIG. 2A. It is noted that $R(t)$ is the autocorrelation function of some pulse, and not the pulse, itself. More specifically, the autocorrelation function $R(t)$ of FIG. 2A corresponds to a pulse, which if selected for transmission on a radio frequency (RF) carrier wave would guarantee no intersymbol interference in a matched filter receiver. However, such pulse, if transmitted without further processing, would have the disadvantage of extending in time over a very large number of bit times. Since the present invention involves storing and transmitting an optimized prototype pulse, the disadvantage of the pulse of FIG. 2A is significant because it would be inefficient to store and retrieve all the data which comprises such a long pulse.

To rapidly attenuate the tails of the $R(t)$ autocorrelation function while still preserving the low intersymbol interference property thereof, $R(t)$ is windowed with an exponential function. (Low intersymbol interference is considered to be less than approximately 10 percent intersymbol interference in the particular application of FIG. 3, although what is considered to be low intersymbol interference may vary to some degree depending on the application.) In this embodiment of the invention, for example, $R(t)$ is windowed with an exponential function $\exp(-(0.165*t)**2)$ shown in FIG. 2B thus producing a windowed autocorrelation function, $R_w(t)$, shown in FIG. 2C. The "tails" of the autocorrelation function are defined to be those portions of the autocorrelation function which extend outward from the center of such function toward plus and minus infinity and which can be eliminated without substantially affecting the signal content of autocorrelation function $R(t)$. In the present example, the positive tail is that portion of $R(t)$ which is greater than $+t_t$ (wherein $+t_t$ is equal to 5) and the negative tail is that portion of $R(t)$ which is less that $-t_t$ (wherein $+t_t$ is equal to 5). These tails are substantially eliminated in order to reduce the length of the resulting pulse. Those skilled in the art will appreciate that the values selected for $+t_t$ and $-t_t$ will vary according to the particular application. Those skilled in the art will also appreciate that windowing functions other than the exponential function given above by way of example may be used to attenuate the tails of the $R(t)$ autocorrelation function as long as the windowing function selected meets the criteria set forth above for substantially attenuating the tails of such autocorrelation function.

The power spectrum of the pulse corresponding to the windowed autocorrelation function $R_w(t)$ is then determined by taking the Fourier transform of $R_w(t)$.

The resultant power spectrum is illustrated in FIG. 2D as $F[R_w(t)]$ vs. frequency f.

The voltage spectrum of the pulse corresponding to the windowed autocorrelation function $R_w(t)$ is then determined by taking the square root of the power spectrum of such pulse. Such voltage spectrum as a function of frequency is designated $F[X(f)]$ and is shown in FIG. 2E. It is noted that the voltage spectrum of FIG. 2E extends in frequency to plus and minus infinity.

The voltage spectrum is then truncated at an upper bound $f_1$ and a lower frequency bound $-f_1$, such upper and lower frequency bounds being selected to minimize the occupied bandwidth of the pulse corresponding to the truncated voltage spectrum thus generated while substantially preserving the low intersymbol interference property of such pulse. The truncated voltage spectrum is shown in FIG. 2F as $Z(f)$ v. frequency. In this particular example, $f_1$ and $-f_1$ are selected to be 0.6348 Hz and $-0.648$ Hz, respectively as per the criteria set forth above.

The truncated voltage spectrum waveform, $Z(f)$ is then inverse Fourier transformed to determine the waveform of the pulse shape, $Z(t)$, which generated or corresponded to such truncated voltage spectrum waveform, $Z(f)$. That is, $Z(t)=F^{-1}[Z(f)]$. The pulse shape of $Z(t)$ is shown in FIG. 2G.

To achieve maximum hardware efficiency, the $Z(t)$ waveform must be truncated to the minimum length which will substantially preserve the properties of low intersymbol interference and compact spectrum For example, in this embodiment of the invention, wherein the prototype optimized pulse is intended for transmission in the QAM transmission system shown in FIG. 3, the pulse function, $Z(t)$, is truncated to a length of 20T wherein T equals one bit time. To achieve such truncation of the $Z(t)$ pulse function, the $Z(t)$ function is windowed with an appropriate cosine function, as shown in FIG. 2H. Such cosine function extends between $-10T$ and $+10T$ and thus extends over the 20 bit times for which windowing is desired. That as, those portions of the $Z(t)$ pulse waveform which appear outside of the 20 bit time window of FIG. 2H are eliminated from the $Z(t)$ waveform to generate the optimum prototype pulse waveform, $Z_w(t)$, as shown in FIG. 2I.

In the example given above, the particular optimized prototype pulse waveform of FIG. 2I has been optimized for transmission on a quadrature amplitude modulation (QAM) type digital transmission system. Those skilled in the art will appreciate that the particular values employed in the steps of the invention may be modified to accommodate other types of digital modulation transmission systems. For example, in some applications the step of windowing the autocorrelation function $R(t)$ is accomplished by windowing with an exponential function having values other than those given above by way of example, as long as the tails of the autocorrelation function are attenuated to the extent necessary for the particular digital modulation system selected and provided the low intersymbol interference property of the windowed autocorrelation function is preserved. Windowing functions other than the exponential function in the example are also employed provided the above criteria are met.

Since different digital modulation schemes tend to result in transmitted signals of different bandwidths, those skilled in the art will appreciate that in the method step of truncating the voltage spectrum at upper and lower frequency bounds, the upper and lower frequency bounds may vary from those in the example above as long as such upper and lower frequency bounds are selected such that the resultant pulse (as modified by the subsequent steps of the method) occupies an acceptable bandwidth when modulated on a radio carrier wave in the particular digital modulation scheme selected. As stated in the example, it is important to the method of the invention that such upper and lower frequency bounds be selected such that the low intersymbol interference property of the corresponding resultant pulse be preserved or substantially preserved.

In the step of windowing the inverse Fourier transform of the truncated voltage spectrum with a function to generate the optimized pulse which is the result of the prior steps of the method, those skilled in the art will appreciate that windowing functions other that the cosine function employed in the above example may be used to limit the length of the optimized pulse in the time domain while substantially preserving the low intersymbol interference property thereof. For example, a Kaiser window or Dolph-Chebyshev window could be employed in the method as long as the above criteria are met. It is again noted that in this windowing step, the length of the optimized pulse in the time domain is limited to the extent required to obtain an acceptably degree of hardware efficiency for the particular application which is intended by the user.

In accordance with the invention, a sample of the optimized pulse waveform of FIG. 2I is provided at least once per bit time. Providing one sample of the optimized pulse waveform per bit time results in a relatively coarse approximation of the optimized pulse waveform. Providing more than one sample of the optimized pulse waveform per bit, for example 2-8 or even more samples, results in a finer approximation of the optimized pulse waveform as shown in FIG. 2J. The samples of the approximation of the optimized pulse waveform of FIG. 2J are obtained by sampling the optimized pulse waveform of FIG. 2I at predetermined time intervals, $t_i$, or by numerically determining the value of the optimize pulse waveform at predetermined time intervals within one bit time as per the already discussed steps of the method of the invention.

FIG. 3 is a block diagram of one transmitter 100 which is employed to transmit the optimized pulse of FIG. 2I. In accordance with the invention, the samples of FIG. 2J are stored in a memory within transmitter 100 and are used as a pattern to reconstruct the pulse of FIG. 2I. When transmitter 100 needs to transmit a digital 1, it transmits the optimized pulse reconstructed (reconstructed pulse) derived from the pulse samples stored in its memory. When transmitter 100 needs to transmit a digital 0, it transmits the negative of the reconstructed pulse derived from the pulse samples stored in its memory.

As already mentioned, the particular "optimized pulse" has, in this present example, been optimized for a QAM type transmitter. Thus, as seen in FIG. 3, a QAM transmitting apparatus including an "in phase" channel (I channel) and a "quadrature channel" (Q channel) is shown as transmitter 100. The signal contents of the Q channel are shifted 90. in phase with respect to the signal contents of the I channel as discussed subsequently.

In more detail, QAM transmitter 100 includes a microprocessor 110 for controlling the operations of transmitter 100. Microprocessor 110 includes data inputs 110A and 110B, and outputs 110C and 110D. Microprocessor 110A includes memory ports 110E and 110F. One microprocessor which may be employed in transmitter 100 as microprocessor 110 is the model TI TMS320/10 manufactured by Texas Instruments, Inc.

Transmitter 100 includes an input 115 coupled to microprocessor data input 110B for directly supplying microprocessor 110 with digital data for which radio transmission is desired. Transmitter 100 also includes a microphone input 120 for providing audio signal input, such as voice, to transmitter 100.

A preamplifier 125 is coupled to the output of microphone 120 to amplify the audio signal generated thereby to a signal level suitable for processing by subsequent stages of transmitter 100. An analog to digital (A/D) converter 127 is coupled between the output of preamplifier 125 and microprocessor data input 110A to convert the analog audio signals to digital audio signals suitable for further digital processing by microprocessor 110.

A random access memory (RAM) 130 is coupled to memory port 110F as shown in FIG. 3 for providing temporary storage to microprocessor 110. A read only memory (ROM) 135 is coupled to memory port 100E. The values of the samples of the optimized pulse waveform shown in FIG. 2J are stored in ROM 135 such that microprocessor 110 can retrieve these sample values and employ them to reconstruct the optimized prototype pulse waveform for transmission by the subsequent stages of transmitter 100.

When microprocessor 110 determines that a logical 1 is to be transmitted (that is, when microprocessor 110A receives a logical 1 from either data input 110A or 110B), then microprocessor 110 retrieves the samples of the optimized pulse from ROM 135 and provides output to tne pulse sample group thus formed to one of data outputs 110C or 110D. However, when microprocessor 110 determines that a logical 0 is to be transmitted (that is, when microprocessor receives a logical 0 from either data input 110A or 110B), then microprocessor 110 retrieves the samples of the optimized pulse from ROM 135 and provide output to the negative of the pulse sample group thus formed at one of data outputs 110C or 110D.

In the actual practice of one embodiment of the invention, pulse sample groups are alternatively provided to data outputs 110C and 110D. Thus, in such embodiment, pulse sample groups are alternatively provided to the I channel for transmission and to the Q channel for transmission.

The I channel includes a D/A converter 140 which is coupled to microprocessor data output 110C. D/A converter 140 converts the pulse sample groups provide thereto into reconstructed analog optimized pulses having substantially the same pulse shape as the optimized pulse of FIG. 2I. The I channel further includes a low pass filter 145 coupled to the output of D/A converter 140 to substantially attenuate any undesired high frequency components which may be present in the reconstructed pulse which is supplied by converter 140. The I channel includes a mixer 150 having an input 150A coupled to the output of filter 145 and an input 150B which is coupled to the output of a carrier frequency oscillator 155. Oscillator 155 generates a carrier signal at the radio frequency at which transmission is desired. The filtered reconstructed pulses which are provided to mixer input 150A are modulated onto the radio frequency carrier provided to mixer input 150B by carrier frequency oscillator 155.

The Q channel includes a D/A converter 160 which is coupled to microprocessor data output 110D. D/A converter 160 converts the pulse sample groups provide thereto into reconstructed analog optimized pulses having substantially the same pulse shape as the optimized pulse of FIG. 2I. The Q channel further includes a low pass filter 165 coupled to the output of D/A converter 160 to substantially attenuate any undesired high frequency components which may be present in the reconstructed pulse which is supplied by converter 160. The Q channel includes a mixer 170 having an input 170A coupled to the output of filter 165 and an input 170B which is coupled to the output of a carrier frequency oscillator 155 via a 90° phase shift network 175 therebetween. The filtered reconstructed pulses which are provided to mixer input 170A are modulated onto the radio frequency carrier wave which is shifted in phase 90° with respect to the carrier signal provided to the I channel.

The outputs of mixers 150 and 170 are coupled to the two inputs of a summing or combiner circuit 180 such that the I channel signal and the Q channel signal are combined prior to transmission. A radio frequency amplifier 185 is coupled to the output of summing circuit 180 to amplify the summed signal to a level sufficient for transmission at antenna 190 which is coupled to the output of amplifier 185.

Figure 4:
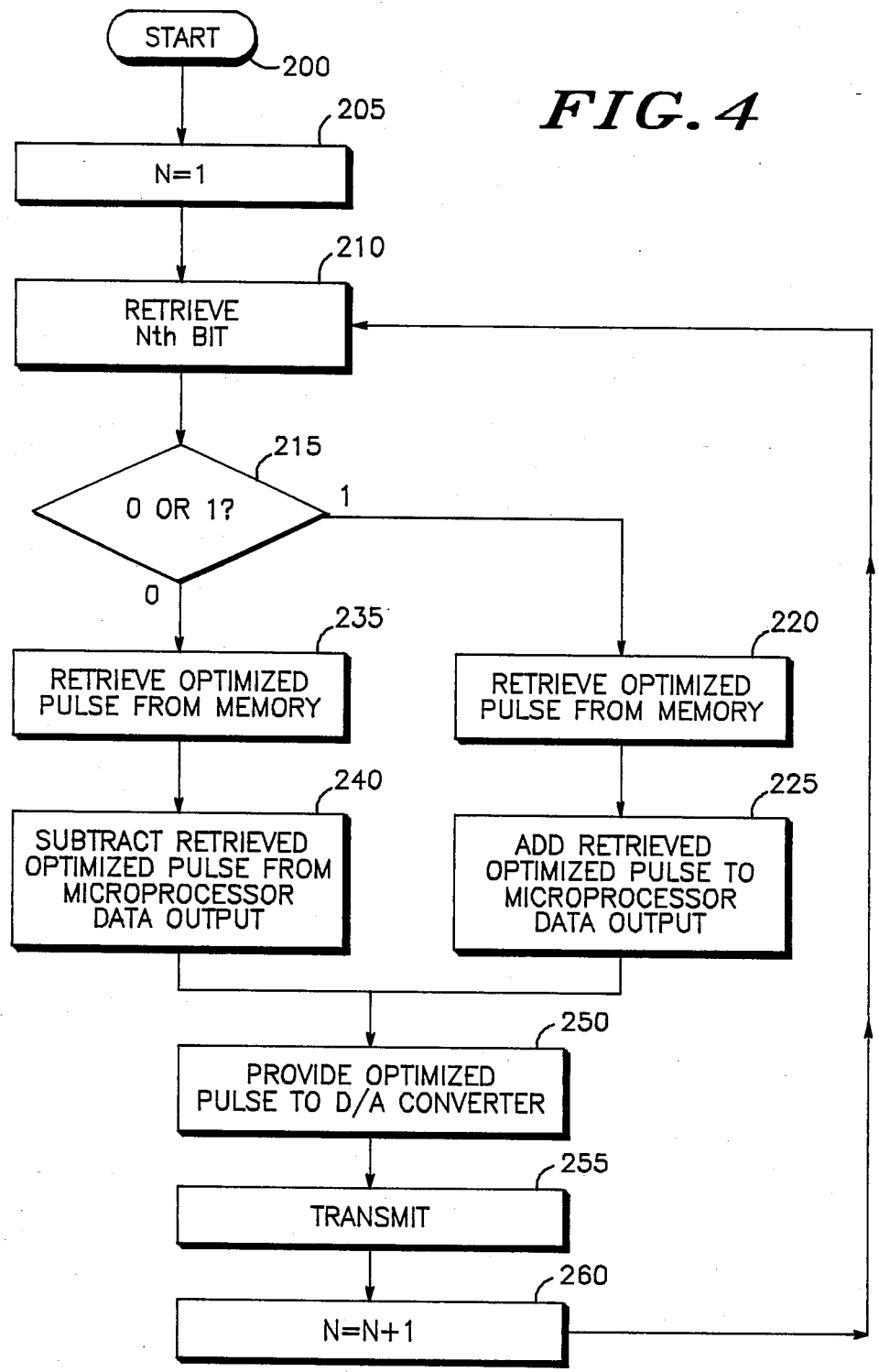
FIG. 4 is a flowchart of the software program which is stored in memory in the transmitting apparatus of FIG. 3 to govern the operation of such transmitting apparatus.

FIG. 4 is a flowchart of the software program which is employed to govern the operation of microprocessor 110 in accordance with the present invention. Such software program is stored in ROM 135. As seen in FIG. 4, the operational routine begins at block 200 at which the system is initialized. N is defined to be an index number which corresponds to each of the bits of data which are to be transmitted by transmitter 100. For example, for the first bit of data at either data input 110A or data input 110B which is to be transmitted, N is defined to be equal to one. For the second bit of such data, N equals 2 and so forth. Flow continues to block 205 at which N, the number of the data input bit, is set to equal 1. At block 210, microprocessor 110 reads the first bit (N=1) of data from either data input 110A or 110B. Microprocessor 110 then determines whether such first bit is a logical 0 or 1 at decision block 215. If the first bit (N=1) is determined to be a logical 1, then microprocessor 110 retrieves the samples of the optimized pulse stored in ROM 135 (block 220) and adds such samples to one of the outputs of microprocessor 110 (block 225). If, however, the first bit (N=1) is determined to be a logical 0, then microprocessor 110 retrieves the samples of the optimized pulse stored in ROM 135 (block 235) and subtracts such samples from one of the outputs of microprocessor 110 (block 240). In either case, the samples of the optimized pulse (whether the positive or the negative thereof) are then provided to a D/A converter (block 250) at which such samples are converted into an analog reproduction of the optimized pulse. The reconstructed optimized pulse is then transmitted by transmitter 100 as per block 255. Microprocessor 110 (as per block 260) then advances the N counter bit to the next bit of input data (N=2) such that microprocessor 110 reads the second bit at block 210 and processes such second bit as described above. Process flow continues in a substantially similar manner for the subsequent bits N=3, 4, . . .

Table 1 is a listing of one example of the object code which is stored in ROM 135 to cause microprocessor 110 to retrieve the optimized pulse from ROM 135 and cause the such pulse or its negative to be transmitted, according to whether a logical 0 or zero is desired to be transmitted.

TABLE 1

```
F0000XMT  11.39000OBFF B0B0020BFFB0B046DBFFB0B046D90020BCE02BCE077F17BF        XMT  11.1
BC800BCE08B55BCBC403BD001BFFFFB60A0BD001BFFC1B60A0BCA00B6B80B55897F0E0F        XMT  11.2
BD100B0200BCB63BFCA0B0470BCE05BC806BD100B030OBCB1FBFCA0B04D4BD1007F11BF        XMT  11.3
B0320BCB0ABFCA0B04F4BD100B032BBCB0ABFCA0B04FFBD100B0336BCB0ABFCA07F0BFF        XMT  11.4
B050ABD100B0341BCB0ABFCA0B0515BCA01B604EB604FBCA00B6050BCA00BA0007F139F        XMT  11.5
BD100B0329BCB09B5D90BFF5ABD100B0334BCB09B5D90BFF46BCE15B604CBCA007F0E6F        XMT  11.6
BA000BD100B033FBCB09B5D90BFF32BD100B034ABCB09B5D90BFF1EBCE15B00177F0F7F        XMT  11.7
B604DB204EB104FB604EBF180B0088BCA19B604EBC104BD001BFFC1B6080BCE007F11DF        XMT  11.8
BCE1FBC104BD001BFFC2B6080B2050B004FB6050BE050BFF80B008ABCE00BCE1F7F0FAF        XMT  11.9
BCA00BA000BD100B0329BCB09B5D90BFF50BD100B0334BCB09B5D90BFF3CBCE157F0F7F        XMT  1110
B604CBCA00BA000BD100B033FBCB09B5D90BFF28BD100B034ABCB09B5D90BFF147F0F8F        XMT  1111
BCE15B001BB604DBCE00BCE1FBCA00BA000BD100B0329BCB09B5D90BFF46BD1007F100F        XMT  1112
B0334BCB09B5D90BFF32BCE15B604CBCA00BA000BD100B033FBCB09B5D90BFF1E7F0E1F        XMT  1113
BD100B034ABCB09B5D90BFF0ABCE15B0019B604DBCE00BCE1FBCA00BA000BD1007F0EEF        XMT  1114
B0329BCB09B5D90BFF3CBD100B0334BCB09B5D90BFF28BCE15B604CBCA00BA0007F0EAF        XMT  1115
BD100B033FBCB09B5C90BFF14BD100B034ABCB09B5C90BFF00BCE15B001AB604D7F0F8F        XMT  1116
B203AB6036B2045B6041BCE00BCE1FBCA00BA000BD100B0329BCB09B5D90BFF327F134F        XMT  1117
BD100B0334BCB09B5D90BFF1EBCE15B604CBCA00BA000BD100B033FBCB09B5D907F0FDF        XMT  1118
BFF5ABD100B034ABCB09B5D90BFF46BCE15B001BB604DBCE00BCE1FBCA00BA0007F0BFF        XMT  1119
BD100B0329BCB09B5D90BFF28BD100B0334BCB09B5D90BFF14BCE15B604CBCA007F0F7F        XMT  1120
BA000BD100B033FBCB09B5D90BFF50BD100B0334ABCB09B5D90BFF3CBCE15B001C7F0EBF       XMT  1121
B604DBCE00BCE1FBCA00BA000BD100B0329BCB09B5D90BFF1EBD100B0334BCB097F0F3F        XMT  1122
B5D90BFF0ABCE15B604CBCA00BA000BD100B033FBCB09B5D90BFF46BD100B034A7F0ECF        XMT  1123
BCB09B5D90BFF32BCE15B001DB604DBCE00BCE1FBCA00BA000BD100B0329BCB097F0E0F        XMT  1124
B5C90BFF14BD100B0334BCB09B5C90BFF00BCE15B604CB2024B6020B202FB602B7F134F        XMT  1125
BCA00BA000BD100B033FBCB09B5D90BFF3CBD100B034ABCB09B5D90BFF28BCE157F0D6F        XMT  1126
B001EB604DBCE00BCE1FBCA00BA000BD100B0329BCB09B5D90BFF5ABD100B03347F10BF        XMT  1127
BCB09B5D90BFF46BCE15B604CBCA00BA000BD100B033FBCB09B5D90BFF32BD1007F0E2F        XMT  1128
B034ABCB09B5D90BFF1EBCE15B001FB604DBCE00BCE1FBCA00BA000BD100B03297F0E3F       XMT  1129
BCB09B5D90BFF50BD100B0334BCB09B5D90BFF3CBCE15B604CBCA00BA000BD1007F0EBF        XMT  1130
B033FBCB09B5D90BFF28BD100B034ABCB09B5D90BFF14BCE15B0000B604DBCE007F0EBF        XMT  1131
BCE1FBCA00BA000BD100B0329BCB09B5D90BFF46BD100B0334BCB09B5D90BFF327F0F2F        XMT  1132
BCE15B604CBCA00BA000BD100B033FBCB09B5D90BFF1EBD100B034ABCB09B5D907F0EFF        XMT  1133
BFF0ABCE15B0001B604DBCE00BCE1FBCA00BA000BD100B0329BCB09B5D90BFF3C7F0D4F        XMT  1134
BD100B0334BCB09B5D90BFF2BBCE15B604CBCA00BA000BD100B033FBCB09B5C907F10AF        XMT  1135
BFF14BD100B034ABCB09B5C90BFF00BCE15B0002B604DB203AB6036B2045B60417F14DF        XMT  1136
BCE00BCE1FBCA00BA000BD100B0329BCB09B5D90BFF32BD100B0334BCB09B5D907F100F        XMT  1137
BFF1EBCE15B604CBCA00BA000BD100B033FBCB09B5D90BFF5ABD100B034ABCB097F0CFF        XMT  1138
B5D90BFF46BCE15B0003B604DBCE00BCE1FBCA00BA000BD100B0329BCB09B5D907F0F9F        XMT  1139
BFF28BD100B0334BCB09B5D90BFF14BCE15B604CBCA00BA000BD100B033FBCB097F0FAF        XMT  1140
B5D90BFF50BD100B034ABCB09B5D90BFF3CBCE15B0004B604DBCE00BCE1FBCA07F0C2F        XMT  1141
BA000BD100B0329BCB09B5D90BFF1EBD100B0334BCB09B5D90BFF0ABCE15B604C7F0F2F        XMT  1142
BCA00BA000BD100B033FBCB09B5D90BFF46BD100B034ABCB09B5D90BFF32BCE157F0E7F        XMT  1143
B0005B604DBCE00BCE1FBCA00BA000BD100B0329BCB09B5C90BFF14BD100B03347F12EF        XMT  1144
BCB09B5C90BFF00BCE15B604CB2024B6020B202FB602BBCA00BA000BD100B033F7F13FF       XMT  1145
BCB09B5D90BFF3CBD100B0334ABCB09B5D90BFF28BCE15B0006B604DBCE00BCE1F7F0B1F      XMT  1146
BCA00BA000BD100B0329BCB09B5D90BFF5ABD100B0334BCB09B5D90BFF46BCE157F0F2F        XMT  1147
B604CBCA00BA000BD100B033FBCB09B5D90BFF32BD100B034ABCB09B5D90BFF1E7F0ECF        XMT  1148
BCE15B0007B604DBCE00BCE1FBCA00BA000BD100B0329BCB09B5D90BFF50BD1007F107F       XMT  1149
B0334BCB09B5D90BFF3CBCE15B604CBCA00BA000BD100B033FBCB09B5D90BFF287F0DCF        XMT  1150
BD100B034ABCB09B5D90BFF14BCE15B0008B604DBCE00BCE1FBCA00BA000BD1007F0FCF        XMT  1151
B0329BCB09B5D90BFF46BD100B0334BCB09B5D90BFF32BCE15B604CBCA00BA0007F0FBF        XMT  1152
BD100B033FBCB09B5D90BFF1EBD100B034ABCB09B5D90BFF0ABCE15B0009B604D7F0DDF        XMT  1153
BCE00BCE1FBCA00BA000BD100B0329BCB09B5D90BFF3CBD100B0334BCB09B5D907F0EFF        XMT  1154
BFF28BCE15B604CBCA00BA000BD100B033FBCB09B5C90BFF14BD100B034ABCB097F0EDF        XMT  1155
B5C90BFF00BCE15B000AB604DB203AB6036B2045B6041BCE00BCE1FBCA00BA0007F12EF       XMT  1156
BD100B0329BCB09B5D90BFF32BD100B0334BCB09B5D90BFF1EBCE15B604CBCA007F0EBF        XMT  1157
BA000BD100B033FBCB09B5D90BFF5ABD100B034ABCB09B5D90BFF46BCE15B000B7F0E9F        XMT  1158
B604DBCE00BCE1FBCA00BA000BD100B0329BCB09B5D90BFF28BD100B0334BCB097F0FFF        XMT  1159
B5D90BFF14BCE15B604CBCA00BA000BD100B033FBCB09B5D90BFF50BD100B034A7F0FDF       XMT  1160
BCB09B5D90BFF3CBCE15B000CB604DBCE00BCE1FBCA00BA000BD100B0329BCB097F0D1F        XMT  1161
B5D90BFF1EBD100B0334BCB09B5D90BFF0ABCE15B604CBCA00BA000BD100B033F7F0EEF       XMT  1162
BCB09B5D90BFF46BD100B034ABCB09B5D90BFF32BCE15B000DB604DBCE00BCE1F7F0B4F       XMT  1163
BCA00BA000BD100B0329BCB09B5C90BFF14BD100B0334BCB09B5C90BFF00BCE157F10FF       XMT  1164
B604CB2024B6020B202FB602BBCA00BA000BD100B033FBCB09B5D90BFF3CBD1007F141F       XMT  1165
B034ABCB09B5D90BFF28BCE15B000EB604DBCE00BCE1FBCA00BA000BD100B03297F0F1F       XMT  1166
BCB09B5D90BFF5ABD100B0334BCB09B5D90BFF46BCE15B604CBCA00BA000BD1007F0E3F       XMT  1167
```

```
B033FBCB09B5D90BFF32BD100B034ABCB09B5D90BFF1EBCE15B000FB604DBCE007F0C9F    XMT  1168
BCE1FBCA00BA000BD100B0329BCB09B5D90BFF50BD100B0334BCB09B5D90BFF3C7F0E6F    XMT  1169
BCE15B604CBCA00BA000BD100B033FBCB09B5D90BFF28BD100B034ABCB09B5D907F0FBF    XMT  1170
BFF14BCE15B0010B604DBCE00BCE1FBCA00BA000BD100B0329BCB09B5D90BFF467F0ECF    XMT  1171
BD100B0334BCB09B5D90BFF32BCE15B604CBCA00BA000BD100B033FBCB09B5D907F10EF    XMT  1172
BFF1EBD100B034ABCB09B5D90BFF0ABCE15B0011B604DBCE00BCE1FBCA00BA0007F0C9F    XMT  1173
BD100B0329BCB09B5D90BFF3CBD100B0334BCB09B5D90BFF28BCE15B604CBCA007F0E6F    XMT  1174
BA000BD100B033FBCB09B5C90BFF14BD100B034ABCB09B5C90BFF00BCE15B00127F114F    XMT  1175
B604DB203AB6036B2045B6041BCE00BCE1FBCA00BA000BD100B0329BCB09B5D907F147F    XMT  1176
BFF32BD100B0334BCB09B5D90BFF1EBCE15B604CBCA00BA000BD100B033FBCB097F0EEF    XMT  1177
B5D90BFF5ABD100B034ABCB09B5D90BFF46BCE15B0013B604DBCE00BCE1FBCA007F0BDF    XMT  1178
BA000BD100B0329BCB09B5D90BFF28BD100B0334BCB09B5D90BFF14BCE15B604C7F10AF    XMT  1179
BCA00BA000BD100B033FBCB09B5D90BFF50BD100B034ABCB09B5D90BFF3CBCE157F0DBF    XMT  1180
B0014B604DBCE00BCE1FBCA00BA000BD100B0329BCB09B5D90BFF1EBD100B03347F11CF    XMT  1181
BCB09B5D90BFF0ABCE15B604CBCA00BA000BD100B033FBCB09B5D90BFF46BD1007F0D6F    XMT  1182
B034ABCB09B5D90BFF32BCE15B0015B604DBCE00BCE1FBCA00BA000BD100B03297F105F    XMT  1183
BCB09B5C90BFF14BD100B0334BCB09B5C90BFF00BCE15B604CB2024B6020B202F7F120F    XMT  1184
B602BBCA00BA000BD100B033FBCB09B5D90BFF3CBD100B0334ABCB09B5D90BFF2B7F0EAF    XMT  1185
BCE15B0016B604DBCE00BCE1FBFF80B0054BE64CBE54DBCE26B0000BFFFEB000B7F0BBF    XMT  1186
BFFDDB0065BFD64BFF49B003DBFFEBB0005B0000B0001BFFFEB0007BFFE7BFCC17F090F    XMT  1187
B001BBFFF9B0002BFFFFB0000B0005BFFEDB0037BFF50BFE77B0078BFFD7B000D7F0BFF    XMT  1188
BFFFDB0000B0003BFFF5B001FBFF93B0118B0014BFFFBB0002B0000B0001BFFFA7F111F    XMT  1189
B0016BFFBEB00E0B0285BFF89B0029BFFF3B0003B0002BFFF3B002EBFF7CB02207F0F9F    XMT  1190
B01E0BFF7AB002FBFFF3B0002B0002BFFFB8001ABFFB6B01D8B002BBFFE4B00097F0D5F    XMT  1191
BFFFEB0000BFFFFB0006BFFECB003ABFFC3BFF13B0043BFFE9B0007BFFFFBFFFE7F019F    XMT  1192
B000BBFFDDB0065BFD64BFF49B003DBFFEBB0005B0000B0001BFFFEB0007BFFE77F0BBF    XMT  1193
BFCC1B001BBFFF9B0002BFFFFB0000B1FE5BFFD7BFFCABFFBFBFFB6BFFB1BFFAE7EFB4F    XMT  1194
BFFAFBFFB2BFFB9BFFC3BFFCEBFFDCBFFEBBFFFBB000BB001BB0029B0036B00417F007F    XMT  1195
B004AB004FB0052B0051B004EB0047B003DB0032B0024B0015B0005BFFF5BFFFF7F183F    XMT  1196
B0001BFFFFBFFFFBFFFFB0001BFFFFBFFFFBFFFFB0001B0000BFFFFB0001BFFFF7EFEBF    XMT  1197
B0001BFFFFB0001BFFFFB0001BFFFFB0001B0000BFFFFB0001B0001B0001BFFFF7F0F0F    XMT  1198
B0001B0001B0001BFFFFB0001B0000BFFFFB0001B0001B0001BFFFFB0001B00017F19EF    XMT  1199
B0001BFFFFB0001B00007FB67F                                                  XMT  1100
  XMT 11.3   12-03-86   20:30:18       ASM32020 PC 1.0 86.036              XMT  1101
```

Figure 5:
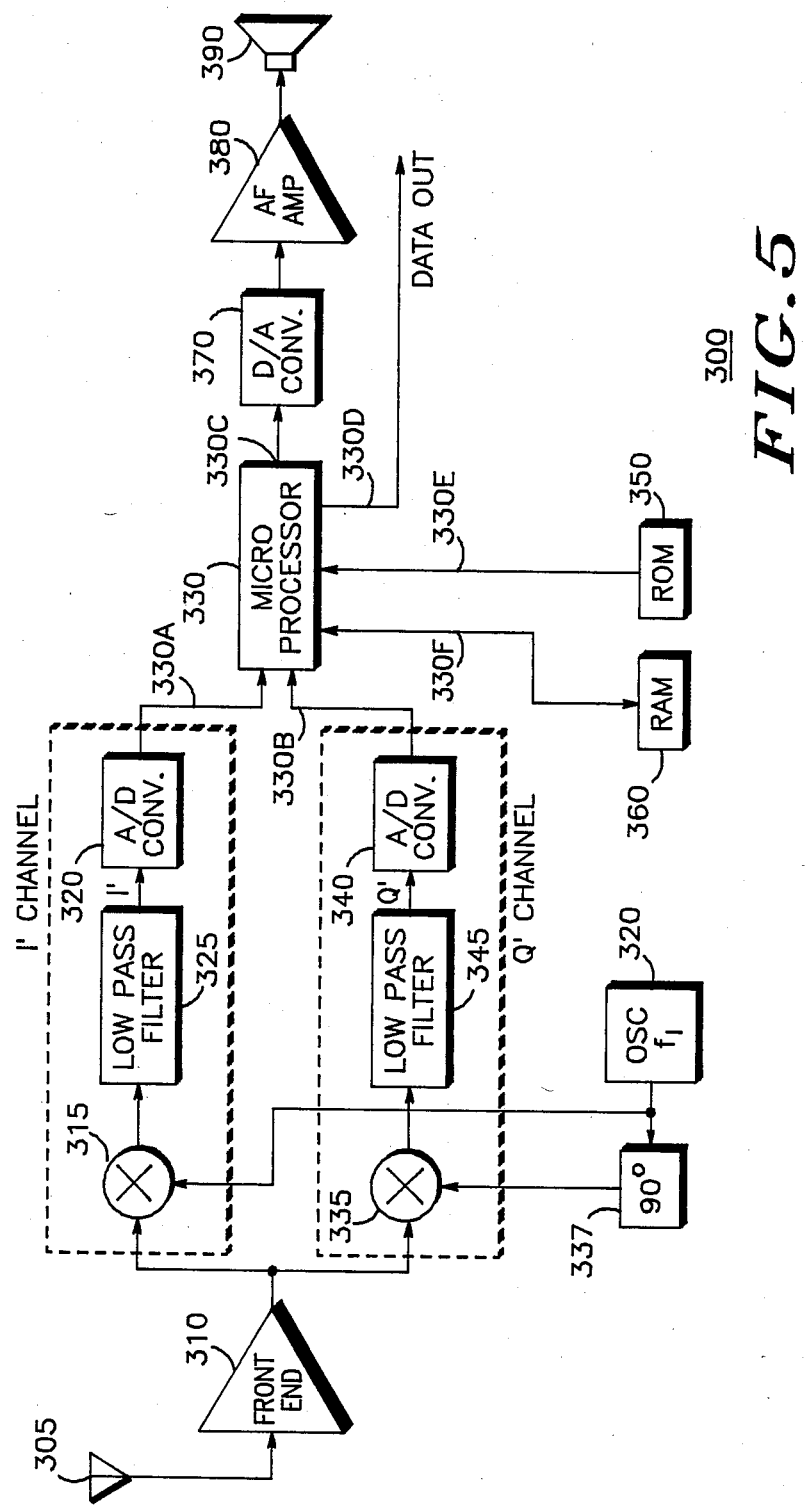
FIG. 5 is a block diagram of receiver apparatus which is employed to receive transmissions of the transmitting apparatus of FIG. 3.

FIG. 5 shows one QAM type receiver 300 which is used to receive the optimized digital pulses transmitted by transmitter 100 of FIG. 3. Receiver 300 is a correlation receiver including an antenna 305 for gathering radio frequency signals which impinge thereon. Antenna 305 is coupled to a receiver front end 310 which amplifies radio signals provided thereto to levels sufficient for processing by the subsequent stages of receiver 300. The output of front end 305 is coupled to the input of the I′ and Q′ channels of receiver 300. That is, the output of front end 310 is coupled to one input of a two input mixer 315, the remaining input of which is coupled to oscillator 320. The frequency of oscillator 320 is selected such that when mixed with the incoming digital radio frequency signal provided to mixer 315, such incoming signal is demodulated to become a baseband I′ (in phase channel) signal appropriate for processing by subsequent stages of receiver 300. The output of mixer 315 is coupled to the input of an A/D converter 320 via a low pass filter 325 therebetween. Filter 325 substantially attenuates any undesired high frequency components which are present in the baseband I′ signal. The filtered I′ channel baseband signal is then converted to a digital I′ channel signal at A/D converter 320. The output of A/D converter 320 is coupled to data input 320A of microprocessor 330. Thus, the I channel demodulates the "in phase" optimized digital radio frequency signal present on the signal from transmitter 100 which is received at receiver 300 and samples each of such optimized pulses to generate pulse samples which are processed by microprocessor 330 in a manner subsequently described.

The output of front end 310 is also coupled to the input of the Q′ (or quadrature) channel of receiver 300 as shown in FIG. 5. More specifically, the output of front end 310 is coupled to one input of a mixer 335, the remaining input of which is coupled to oscillator 320 via a 90° phase shift network 337 therebetween. Thus, mixer 335 demodulates those signal components of the received digital radio frequency signal which are in quadrature relationship with the "in phase" signal components of the received digital radio frequency signal. The output of mixer 335 is coupled to the input of an A/D converter 340 via a low pass filter 345 therebetween. Filter 345 substantially attenuates any undesired high frequency signal components which may be present in the demodulated quadrature baseband signal generated at the output of mixer 335. The filtered Q′ channel baseband signal is then converted to a digital Q′ channel signal at A/D converter 320. The output of A/D converter 340 is coupled to data input 320B of microprocessor 330. Thus, the Q channel demodulates the "quadrature phase" digital pulse radio frequency signal received at receiver 300 and samples each of optimized prototype pulses thereof to generate digital pulse samples which are processed by microprocessor 330 in a manner subsequently described.

One microprocessor which may be employed as microprocessor 330 is the model TMS 320/10 manufactured by Texas Instruments, Inc. Microprocessor 330 includes data outputs 330C and 330D, and further includes memory ports 330E and 330F. A read only memory (ROM) 350, which is coupled to memory port 330E, contains appropriate software code according to the subsequent flowchart of FIG. 6 for instructing microprocessor 330 how to process the digital signals it receives on data ports 330A and 330B from the I′ and Q′ channels, respectively. An approximate replica of the shape of the optimized pulse transmitted by transmitter 100 is stored in ROM 350 to enable microprocessor to properly receive and process the demodulated pulse samples which it is provided on its data inputs 330A and 330B. For convenience, essentially the same pulse shape information which is stored in ROM 135 of transmitter 100 is stored in ROM 335 of receiver 300. A random access memory (RAM) 360 is coupled to memory port 330F to provide temporary storage for microprocessor 330. In accordance with the flowchart of FIG. 6, microprocessor 330 processes the pulse samples it is provided by the I' and Q' channels and generates either an information digital signal at data output 330D or a voice data signal at data output 330E, depending on what type of signal is being received at the present time. In the case of voice data signals, it is noted that microprocessor data output 330C is coupled to the input of a D/A converter 370 to convert such digital voice signals to analog voice signals. The analog voice signals thus generated are amplified by audio amplifier 380 which is coupled to speaker 390 for output to the user. Received digital data signals are provided output at data output 330D.

Figure 6:
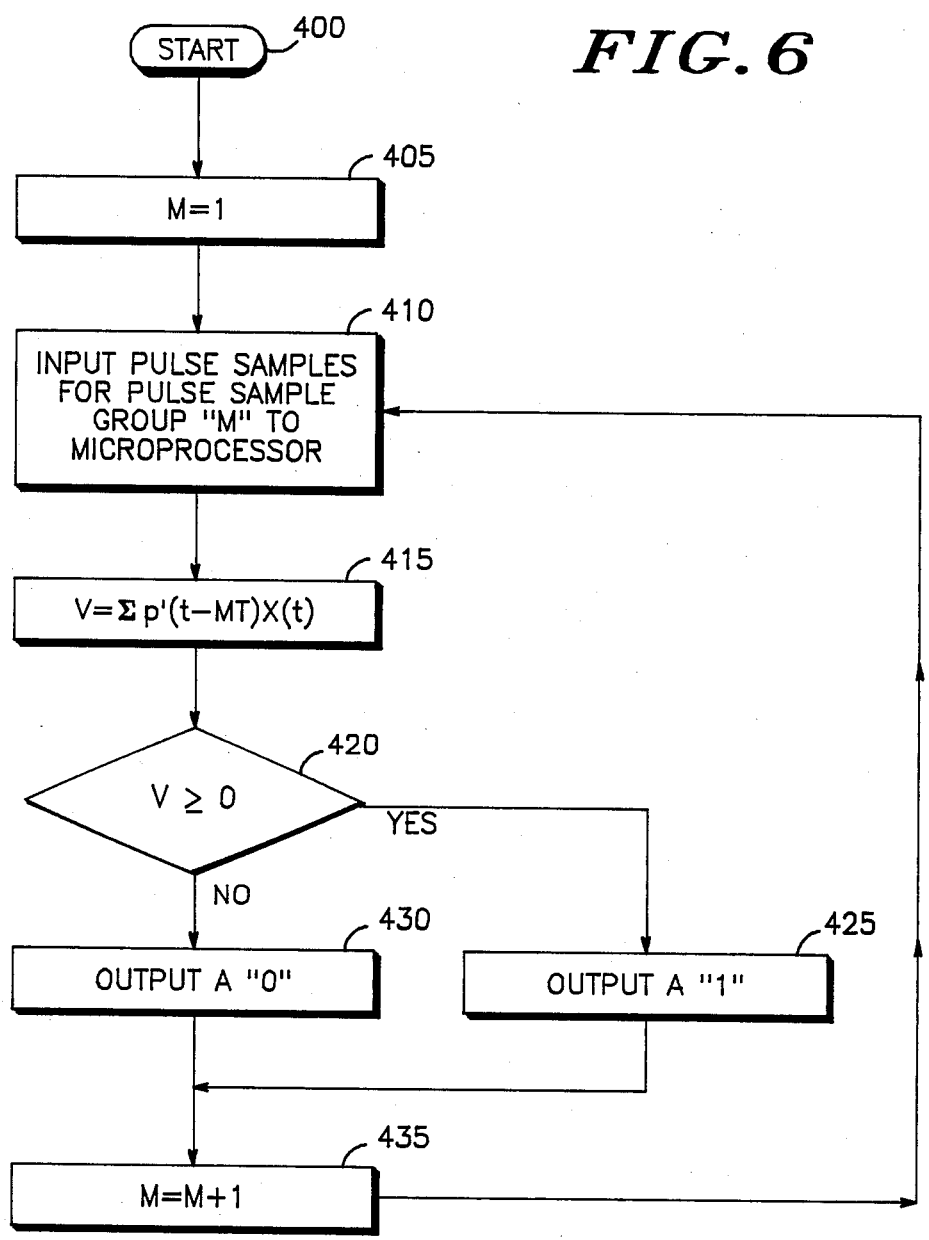
FIG. 6 is a flowchart of the software program which is stored in memory in the receiver apparatus of FIG. 5 to govern the operation of such receiver apparatus.

FIG. 6 is a flowchart of the operation of microprocessor 330. The operation of microprocessor 330 is started or initialized at block 400. Flow continues to block 405 at which counter M is set to 1 to correspond to the first pulse sample group which microprocessor 330 is to process. It is noted that the first pulse sample group is comprised of the samples of the first optimized prototype pulse received by receiver 300. (In one embodiment of the invention, A/D converters 320 and 340 alternately take samples of each received pulse. That is, A/D converter 340 takes samples of a first received pulse (M=1) to form a first pulse sample group. A/D converter 360 then takes samples of a second received pulse (M=2) to form a second pulse sample group. A/D converter 340 then takes samples of the third received pulse (M=3) to form a third pulse sample group. This sampling process continues in the same manner with subsequent pulses, that is, alternating between the I' and Q' channels as above.) Returning again to the discussion of reception of the first pulse, microprocessor 330 reads the pulse samples of the first pulse (M=1) present at one of the data inputs of microprocessor 330 as per block 410. Microprocessor 330 then determines, as per block 415, the value of V for the first pulse group wherein $$V = \Sigma p'(t - MT_b) X(t)$$

and wherein p' is the receiver correlation waveform;

X(t) refers to each sample from A/D converter 320 and 340 at time t;

M is the pulse number or bit number;

$T_b$ is the normalized bit period, and t is time.

More specifically, microprocessor 330 determines V for a the first pulse group by calculating the sum of the product $p'(t-MT_b)X(t)$ for all values of t where $p'(t-MT_b)$ is nonzero. As part of this summation step, microprocessor 330 retrieves the correlation waveform, p', from memory. To achieve maximum power efficiency, the correlation waveform p' employed by correlation receiver 300 of FIG. 5 is the same prototype pulse waveform as that which is transmitted by transmitter 100 of FIG. 3. It is noted that a somewhat shorter pulse than used in transmitter 100 may be employed in receiver 300 as the correlation waveform as long as the pulse is not so short that receiver performance is significantly degraded.

After determining the value of V for the first pulse sample group (M=1) in the above manner, microprocessor 330 then determines whether such value of V is greater than or equal to zero (0) as per decision block 420. If the value of V for the first pulse sample group is determined to be greater than or equal to zero, then microprocessor 330 generates a 1 at one of its data outputs as per block 425. If the value of V for the first pulse sample group is determined to be less than zero, then microprocessor 330 generates a 0 at one of its data outputs as per block 430. The transmitted signal is thus reconstructed as a series of 1's and 0's at the outputs of microprocessor 330.

Microprocessor 330 then adds 1 to the counter M as per block 435 such that M=2. Process flow then loops back to block 410 at which microprocessor 330 reads the samples of the second pulse group provided to the data inputs thereof. The summation step wherein V is determined proceeds as before as does the determination of whether the samples of the second pulse group correspond to a logical 0 or 1. Processing of successive pulse sample groups 3, 4, . . . continue in substantially the same manner as described above.

Table 2 is a listing of one example of object code which is stored in ROM 350 to cause microprocessor 330 process the received optimized pulses in the manner described obove.

TABLE 2

```
FOOOREC  11.490000BFF80B0020BFF80B01DC90020BCE03BCE07BC800BCE087F190F  REC  11.1
B5588BC003BD001BFFFFB60A0BD001BFFE1B60A0BCA00B6B80B5588BD000B02007F123F  REC  11.2
BC B50BFCA0B01E3BCE04BC806BD000B0300BCB5B8FCA0B0254B204AB604CBCE007F0FBF  REC  11.3
BCE1FBCA01B004B84E53B6046B004FB4E53B6047B1001B0221B0046B6042B00547F18BF  REC  11.4
B6044B0054B6043B00054B6045BD001B0221B0047B6048B0054B6049B2025B30427F20EF  REC  11.5
B1080B0030B6025BF480B0063BCE1BBCB03BCE19BCE23BFF80B0065BCB03BCE197F110F  REC  11.6
B6036B3043B1080B0026B6026BF480B0072BCE1BBCB02BCE19BCE23BFF80B00747F14CF  REC  11.7
BCB02BCE19B6034B3048B2080B6032B3042B2030B6080B3043B2036B6080B20277F1DBF  REC  11.8
B3044B1080B0031B6027BF480B0068BCE1BBCB03BCE19BCE23BFF80B008DBCB037F112F  REC  11.9
BCE19B6036B3045B1080B0028B6028BF480B0009ABCE1BBCB02BCE19BCE23BFF807F10EF  REC  1110
B009CBCB02BCE19B6035B3049B2080B6033B3044B2031B60B0B3045B2036B60807F1C2F  REC  1111
B3934BCA00B3935BCE15BC B01BCE19B6036B2124B0024BCB01BCE19B0036B60247F153F  REC  1112
B2A24BF180B00B8BD501B080B6841B3C33B3835BCE14B3C32B3834BCE15B603E7F153F  REC  1113
BCE1BB603FB413FBCB0FB4741B6040B203EBF480B00CCBCA00B1040B6040B20407F147F  REC  1114
B105 5B60 0B3C 32B3835BCE14BCE23B3C33B3834BCE15B603EBCE1BB603FB413F7F124F  REC  1115
BC B0FB4741B6040B203E BF480B00E3BCA00B1040B6040B2040B6012BCA01B002E7F188F  REC  1116
B4E53B602EB0056B603BB303B83C80B3812BCE14B6037B202BBF680B0162B104F7F16CF  REC  1117
B602BB105 6BF480B01D5BD001B0004B002EB4E53B6027B2037BF480B0106BCE1B7F16EF  REC  1118
BCB03BCE19BCE23BFF80B01 6BCB03BCE19B002CB602CB202F B0056B603CB303C7F107F  REC  1119
B3C80B3812BCE14BF480B0119BCE1BBCB03BCE19BCE23BFF80B011BBCB03BCE197F0C5F  REC  1120
```

```
B002DB602DB202BBF180B01D5B202CBF180B0141B202DBF180B0133B102CBF1807F17FF    REC  1121
B012EB202EB0052B602EBFF80B015DB202EB0051B602EBFF80B015DB202DB002C7F155F    REC  1122
BF180B013CB202EB0050B602EBFF80B015DB202EB004FB602EBFF80B015DB202D7F13AF    REC  1123
BF180B0151B002CBF180B014CB202EB1052B602EBFF80B015DB202EB1051B602E7F174F    REC  1124
BFF80B015DB202DB102CBF180B015AB202EB1050B602EBFF80B015DB202EB104F7F13FF    REC  1125
B602EBCA00B602CB602DBFF80B01D5B202AB0037B602AB202AB1057BF480B01707F165F    REC  1126
B0058BF280B0176BCA00B6029BFF80B017AB602ABD001B0001B6029BFF80B017A7F165F    REC  1127
B602ABD001BFFFFB6029B202EBCE19B4E4FBF680B0190BCE05BD000B0310BCB107F101F    REC  1128
B5690BCA00BA000BD000B0322BCB10B5C90BFF10BCE04BCE15B6037BFF80B019F7F119F    REC  1129
BCE05BD000B0322BCB10B5690BCA00BA000BD000B0310BCB10B5C90BFF10BCE047F140F    REC  1130
BCE15B6037BCE04B2037B103BBF180B01ADB003B1039BF280B01B2BD001B00027F184F    REC  1131
B603ABFF80B01B4BD001B0001B603ABFF80B01B4BCA00B603AB204BBF680B01BB7F130F    REC  1132
B104FB604BBFF80B01D5BE03ABEE37BD001B0261B002EB604EB304EB203AB10807F13EF    REC  1133
BF680B01C9B204DB004FB604DB204CBF680B01D0B104FB604CBFF80B01D5B204A7F12DF   REC  1134
B604CBED4DBCA00B604DBEC3DBE129B203DB004FB603DBFF80B003DB8130B80317F0FCF    REC  1135
B2C30B6830B2C31B6831BCE26B002FB0035B0033B002AB001AB0006BFFF2BFFDF7F140F    REC  1136
BFFD1BFFCBBFFCDBFFD6BFFE6BFFFAB000EB0021BFFF6BFFF5BFFFDB0000B001E7EFD7F   REC  1137
B0035BFFD5BFFC1B001FB0003BFFFFB0016BFFF8B0006B0000BFFFDB0004B00007F0FFF   REC  1138
B0000B0000B0000B0000B0000B0000B0000B0000B0000B0000B0000B0000B00007F2AFF   REC  1139
B0000B0000B0000B0000B0000B0000B0000B0000B0000B0000B0000B0000B00007F2AFF   REC  1140
B0000B0000B0000B0000B0000B0000B0000B0000B0000B0000B0000B0000B00007F2AFF   REC  1141
B0000B0000B0000B0000B0000B0000B0000B0000B0000B0000B0000B0000B00007F2AFF   REC  1142
B0000B0000B0000B0000B0000B0000B0000B0000B0000B0000B0000B0001B00017F2ADF   REC  1143
B0001B0001B0001B0001B0001B0001B0001B0001B0001B0001B0001B0001B00017F2A2F   REC  1144
B0001B0000B0000B0000B0000B0000B0000B0000B0000B0000B0000B0000B00007F2AEF   REC  1145
B0000B0000B0000B0000B0000B0000B0000B0000B0000B0000B0000B0000B00007F2AFF   REC  1146
B0000B0000B0000B0000B0000B0000B0000B0000B0000B0000B0000B0000B00007F2AFF   REC  1147
B0000B0000B0000B0000B0000B0264B0000B0000B0008B0000B0000B0000B00007F29BF   REC  1148
B0000B0000B0000B0000B0000B0000B0000B0000B0000B0000B0000B0000B00007F2AFF   REC  1149
B0000B0000B0000B0000B0000B0000BFFFFB0000B0000B0000B0009B0010B00097F244F   REC  1150
B0000B0000B0001B0003B0005B0007B000FB0010B0020B0200B2000B40007F380F        REC  1151
:  REC  11.9   12-02-86   12:51:36   ASM32020 PC 1.0 86.036                REC  1152
```

Referring again to FIG. 3, in actual practice, when transmitter 100 transmits optimized pulses, in one embodiment of the invention it does so by transmitting a first optimized pulse on the I channel, a second optimized pulse on the Q channel, a third optimized pulse on the I channel, and so forth. That is, transmitter 100 alternates between the I and Q channels for transmission of every other pulse. In such an embodiment, the corresponding correlation receiver used to receive such transmitted pulse signals also alternates processing between the I' and Q' channels to receive such pulse signals.

Other embodiments of the invention are contemplated where two separate data streams are transmitted on the I and Q channels of transmitter 100. In that case, the correlation receiver treats the I' and Q' channels as sources of separate data streams and processes the received pulse sample groups accordingly.

Figure 7:
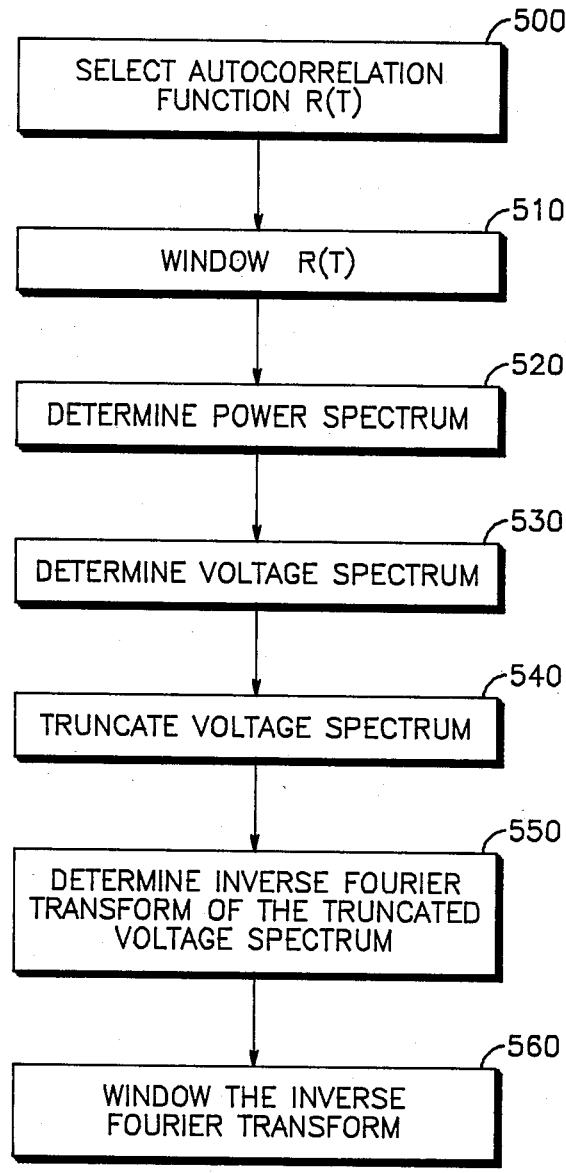
FIG. 7 is a flowchart of the method of the invention.

From the above description and as summarized in the flow chart of FIG. 7, it is seen that a method is disclosed for transmitting QAM signals on respective in-phase (I) and quadrature (Q) channels including the step of retrieving an optimized pulse stored in a memory. The optimized pulse is generated by selecting an autocorrelation function R(t) exhibiting the property of low intersymbol interference and corresponding to a first pulse as per block 500. The autocorrelation function R(t) is then windowed with a function selected to attenuate the tails of the autocorrelation function R(t) while substantially preserving the low intersymbol interference property thereof as shown in block 510. A windowed autocorrelation function $R_w(t)$ is thus generated corresponding to a second pulse. The power spectrum of the second pulse is determined by taking the Fourier transform of the windowed autocorrelation function $R_w(t)$ as in block 520. The voltage spectrum of the second pulse is then determined as per block 530. The voltage spectrum is then truncated at upper and lower frequency bounds to generate a truncated voltage spectrum corresponding to a third pulse as per block 540. The upper and lower frequency bounds are selected to minimize the occupied bandwidth of the third pulse while substantially preserving the low intersymbol interference property thereof. The inverse Fourier transform of the truncated voltage spectrum is determined as in block 550. As per block 560, the inverse Fourier transform of the truncated voltage spectrum is then windowed with an arbitrary function to generate the optimized pulse. The arbitrary function is selected to minimize the length of the optimized pulse in the time domain while substantially preserving its low intersymbol interference property and substantially minimizing the occupied bandwidth. The method continues with the step of transmitting the optimized pulse thus formed on one of the I and Q channels when a 1 desired to be transmitted, and transmitting the negative of the optimized pulse thus formed on one of the I and Q channels when a 0 is desired to be transmitted.

From the above description, it is clear that the invention involves a not only a method of transmitting digital signals, but also apparatus for transmitting such signals. In summary, such apparatus includes a memory for storing a plurality of samples which together correspond to a predetermined pulse shape. The apparatus further includes a digital to analog conversion circuit, coupled to memory, for converting the plurality of samples to an analog signal exhibiting the predetermined pulse shape. A circuit, coupled to the digital to analog converter, is provided for transmitting the predetermined pulse shape modulated on a radio frequency carrier wave when one of first and second digital signals are desired to be communicated, and for transmitting the negative of the predetermined pulse shape when the other of the first and second digital signal levels is desired to be communicated.

The foregoing describes an method and apparatus for transmitting digital signals in which unique pulse shaping is employed to generate a digital pulse which is transmitted with a relatively bit rate and yet with simultaneous high spectral efficiency. Moreover, such pulse shaping method and apparatus permits generation of a digital pulse which can be transmitted at relatively low power levels and yet be effectively received.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. A method of transmitting QAM signals on respective in-phase (I) and quadrature (Q) channels comprising the steps of:
   retrieving an optimized pulse stored in a memory, wherein said pulse in generated by:
   selecting an autocorrelation function $R(t)$ exhibiting the property of low intersymbol interference and corresponding to a first pulse;
   windowing said autocorrelation function $R(t)$ with a function selected to attenuate the tails of said autocorrelation function $R(t)$ while substantially preserving the low intersymbol interference property thereof, thus generating a windowed autocorrelation function $R_w(t)$ corresponding to a second pulse;
   determining the power spectrum of said second pulse by taking the Fourier transform of said windowed autocorrelation function $R_w(t)$;
   determining the voltage spectrum of said second pulse;
   truncating said voltage spectrum at upper and lower frequency bounds to generate a truncated voltage spectrum corresponding to a third pulse, said upper and lower frequency bounds being selected to minimize the occupied bandwidth of said third pulse while substantially preserving the low intersymbol interference property thereof;
   determining the inverse Fourier transform of said truncated voltage spectrum, and
   windowing the inverse Fourier transform of said truncated voltage spectrum with an arbitrary function to generate said optimized pulse, said arbitrary function being selected to minize the length of said optimized pulse in the time domain while substantially preserving its low intersymbol interference property and substantially minimizing said occupied bandwidth;
   transmitting the optimized pulse thus formed on one of said I an Q channels when a 1 is desired to be transmitted, and
   transmitting the negative of the optimized pulse thus formed on one of said I and Q channels when a 0 is desired to be transmitted.

2. The method of claim 1 wherein said step of determining the voltage spectrum of said second pulse is achieved by taking the square root of said power spectrum.

3. A method for generating an optimized electric pulse comprising the steps of:
   selecting an autocorrelation function $R(t)$ exhibiting the property of low intersymbol interference and corresponding to a first pulse;
   windowing said autocorrelation function $R(t)$ with a first windowing function selected to attenuate the tails of the said autocorrelation function $R(t)$ while substantially preserving the low intersymbol interference property thereof, thus generating a windowed autocorrelation function $R_w(t)$ corresponding to a second pulse;
   determining the voltage spectrum of said second pulse in the frequency domain;
   truncating said voltage spectrum at upper and lower frequency bounds to generate a truncated voltage spectrum corresponding to a third pulse, said upper and lower frequency bounds being selected to minimize the occupied bandwidth of said third pulse while substantially preserving the low intersymbol interference property thereof;
   determining the inverse Fourier transform of said truncated voltage spectrum, and
   windowing the inverse Fourier transform of said truncated voltage spectrum with a second windowing function to generate said optimized pulse, said second windowing function being selected to minimize the length of said optimized pulse in the time domain while substantially preserving its low intersymbol interference property and substantially minimizing said occupied bandwidth.

4. A method for generating an optimized electric pulse comprising the steps of:
   selecting an autocorrelation function $R(t)$ exhibiting the property of low intersymbol interference and corresponding to a first pulse;
   windowing said autocorrelation function $R(t)$ with an exponential function selected to attenuate the tails of said autocorrelation function $R(t)$ while substantially preserving the low intersymbol interference property thereof, thus generating a windowed autocorrelation function $R_w(t)$ corresponding to a second pulse;
   determining the power spectrum of said second pulse by taking the Fourier transform of said windowed autocorrelation function $R_w(t)$;
   determining the voltage spectrum of said second pulse by taking the square root of the said power spectrum;
   truncating said voltage spectrum at upper and lower frequency bounds to generate a truncated voltage spectrum corresponding to a third pulse, said upper and lower frequency bounds being selected to minimize the occupied bandwidth of said third pulse while substantially preserving the low intersymbol interference property thereof;
   determining the inverse Fourier transform of said truncated voltage spectrum, and
   windowing the inverse Fourier transform of said truncated voltage spectrum with a cosine function to generate said optimized pulse, said cosine function being selected to minimize the length of said optimized pulse in the time domain while substantially preserving its low intersymbol interference property and while minimizing said occupied bandwidth.

5. The method of claim 4 wherein said step of selecting an autocorrelation function $R(t)$ includes selecting an autocorrelation function $R(t)$ which exhibits a maximum at time, $t=0$, and periodic zeroes at N times the bit time of said pulse, wherein $N=1,2,3 \ldots$ and $N=-1,-2,-3 \ldots$

* * * * *

UNITED STATES PATENT AND TRADEMARK OFFICE
CERTIFICATE OF CORRECTION

PATENT NO. : 4,737,969

DATED : April 12, 1988

INVENTOR(S) : STEEL, ET AL.

It is certified that error appears in the above-identified patent and that said Letters Patent is hereby corrected as shown below:

In Claim 1, line 49, delete "minize" and insert -- minimize --.

Signed and Sealed this

Eleventh Day of July, 1989

Attest:

DONALD J. QUIGG

*Attesting Officer*  *Commissioner of Patents and Trademarks*